(12) United States Patent
Bowater et al.

(10) Patent No.: US 7,765,650 B2
(45) Date of Patent: Aug. 3, 2010

(54) TWO-PIECE HOSE CLAMP AND VARIABLE LENGTH CLAMP KIT

(75) Inventors: Bruce D. Bowater, Jacksonville Beach, FL (US); Eduardo Manglicmot, Jacksonville, FL (US); Antonio J. Marques, St. Augustine, FL (US); John Mazzetti, St. Augustine, FL (US)

(73) Assignee: Epicor Industries, Inc., Smyrna, TN (US)

( * ) Notice: Subject to any disclaimer, the term of this patent is extended or adjusted under 35 U.S.C. 154(b) by 707 days.

(21) Appl. No.: 11/804,809

(22) Filed: May 21, 2007

(65) Prior Publication Data

US 2008/0289153 A1 Nov. 27, 2008

(51) Int. Cl.
A44B 11/25 (2006.01)
B23P 19/10 (2006.01)

(52) U.S. Cl. .................... 24/274 R; 24/20 R; 24/279; 285/252

(58) Field of Classification Search ............... 24/274 R, 24/274 P, 274 WB, 20 R, 279, 282, 284, 286; 439/758; 285/420, 23, 252, 253, 254, 245
See application file for complete search history.

(56) References Cited

U.S. PATENT DOCUMENTS

| | | | | |
|---|---|---|---|---|
| 1,986,748 A | * | 1/1935 | Pritchard | 24/281 |
| 1,999,683 A | * | 4/1935 | Borresen | 24/275 |
| 2,452,806 A | * | 11/1948 | Tetzlaff et al. | 24/274 R |
| 2,847,742 A | | 8/1958 | Oetiker | 24/19 |
| 3,235,925 A | | 2/1966 | Gerhardt et al. | 24/23 |
| 3,276,090 A | * | 10/1966 | Nigon | 24/274 R |
| 3,303,544 A | * | 2/1967 | Nigon | 24/274 R |
| 3,510,918 A | | 5/1970 | Oetiker | 24/19 |
| 3,747,172 A | | 7/1973 | Tarzian | 24/282 |
| 3,769,665 A | | 11/1973 | McKown, Jr. | 24/274 |
| 3,900,932 A | * | 8/1975 | Allert | 24/274 R |
| 3,924,308 A | * | 12/1975 | Duprez | 24/274 R |
| 3,950,830 A | * | 4/1976 | Duprez | 24/274 R |
| 3,981,053 A | | 9/1976 | Kreuzer | 24/274 |
| 4,308,648 A | * | 1/1982 | Fay | 24/274 R |
| 4,637,100 A | | 1/1987 | Ishihata | 24/274 |
| 4,803,758 A | * | 2/1989 | Calmettes | 24/20 R |
| 4,887,334 A | * | 12/1989 | Jansen et al. | 24/23 R |
| 4,914,788 A | | 4/1990 | Ojima | 24/20 R |

(Continued)

*Primary Examiner*—Robert J Sandy
*Assistant Examiner*—Rowland D Do
(74) *Attorney, Agent, or Firm*—P. N. Dunlap, Esq.; J. A. Thurnau, Esq.; J. L. Mahurin, Esq.

(57) ABSTRACT

A hose clamp kit having a coil of perforated band material marked at regular intervals to enable detaching of a desired length of band, and a housing assembly with a worm drive near one end of a housing plate which has near the opposite end one or more protrusions and a detent. One end of the length of band is held in place by the detent, while the perforations engage or snap onto the protrusions. The other end encircles a hose, engaging the worm-gear housing for tightening. A protrusion may be rounded, may be formed by pushing up the plate material residing between two slots in the plate, and/or may be sized for an interference fit into a perforation. The detent may be a raised tab, bent horizontal to the plate and in the direction of the protrusions. A hose clamp and a method of clamping are also described.

20 Claims, 2 Drawing Sheets

U.S. PATENT DOCUMENTS

| | | | | |
|---|---|---|---|---|
| 4,956,898 A | * | 9/1990 | Miyamura et al. | 24/274 R |
| RE33,934 E | | 5/1992 | Oetiker | 24/19 |
| 5,170,540 A | * | 12/1992 | Oetiker | 24/284 |
| 5,305,499 A | * | 4/1994 | Oetiker | 24/20 R |
| 5,315,742 A | * | 5/1994 | Fay | 24/274 R |
| 5,560,087 A | * | 10/1996 | Marques | 24/274 R |
| RE35,384 E | | 12/1996 | Oetiker | 24/20 R |

\* cited by examiner

TWO-PIECE HOSE CLAMP AND VARIABLE LENGTH CLAMP KIT

BACKGROUND OF THE INVENTION

This invention relates generally to hose clamps, more particularly to a clamp kit for assembling hose clamps of various sizes, and specifically to a two-piece, variable-length, worm-drive, band clamp.

Hose clamps are commonly utilized to join hoses and fittings or connectors (referred to hereinafter as fittings) together, especially within the automotive and marine industries. Hose clamps are also used for general binding up of various articles. A typical worm-drive band clamp is disclosed in U.S. Pat. No. 4,637,100.

A collection of clamp sizes is generally required in order to be prepared for various clamp situations, including emergency repair situations. Various approaches have been proposed to enable a wide variety of clamp sizes to be made from a minimum inventory of components. An example is U.S. Pat. No. 2,847,742 which discloses a two or more piece clamp having a perforated metal band which can be supplied in a reel and cut to a desired length. The ends of a section of band are held in place by a bridge member with hooks. In addition to requiring a cutting tool, assembly requires a tightening tool. However, in emergency repair situations, assembly without tools may be desirable.

Another example is U.S. Pat. No. 3,747,172 which discloses a multi-piece clamp in which the band is made of interlocking segments. Longer clamps require many segments. U.S. Pat. No. 3,769,665 also discloses a three-piece variable length worm driven clamp. In general, fewer than three components and simpler designs are desirable for ease of use and ease of manufacture.

U.S. Pat. No. 3,981,053 discloses a two-part, variable-length, worm-drive clamp having a tensioning strip with a tab that interlocks with a tab-receiving opening in a band-forming strip. Notches in the edge are used to facilitate breaking off lengths of band-forming strip. The tab-receiving openings are large relative to worm-engaging slots, requiring the relatively complicated band to have two types of openings, plus edge notches, and to be limited to relatively long unit lengths between tab-receiving openings.

It is not known or suggested to use a coil of band material having a single, perforation size uniformly distributed along its entire length and regularly marked, in conjunction with a worm-drive housing on a plate having a detent which engages one end of a section of band without recourse to a tab-receiving opening and having one or more protrusions which engage the perforations of a section of band, to form a variable-length, two-piece, hose clamp.

SUMMARY

The present invention is directed to systems and methods which provide a variable length, hose clamp or clamp kit with only two necessary components, useful to make a wide variety of sizes of hose clamp without need for tools.

The invention is directed to a clamp kit having a coil of perforated band material which may be coined, scored, or marked at regular intervals to facilitate detaching, snapping, or cutting off a desired length of band, a housing assembly with a worm drive attached near one end of a housing plate which has near the opposite end at least one protrusion and a detent. One end of the length of perforated band is held in place by the detent, while the perforated band fits over or snaps onto or engages the protrusion or protrusions, and the other end of the band encircles a hose or other item or items and engages in the worm-gear housing for tightening. A protrusion may be formed by pushing up the material residing between two slots or slits in the housing plate. A protrusion may be rounded. A protrusion may be sized for an interference fit or a clearance fit into a perforation of the band material. Additional protrusions may be sized for either an interference fit or non-interference fit with the perforations. The detent may be a raised tab, bent over horizontal to the plate and in the direction of the protrusions and in the direction away from the housing assembly, extending toward the protrusions on the opposite end of the housing plate.

The invention is also directed to a hose clamp having a predetermined length of perforated band, a housing assembly with a worm-gear housing mounted on a housing plate which has one or more protrusions and a raised detent. One end of the perforated band is held in place by the detent, the perforated band snaps onto the one or more protrusions, and the other end of the band encircles a hose and engages in the worm-gear housing for tightening.

The number of protrusions on the housing plate may be as many as desired, or in the range from one or two to six, or in the range from three to four. At least one protrusion may be somewhat larger than the perforation it fits into, creating an interference fit.

The invention is also directed to a method of clamping at least one item comprising the steps of (a) selecting a suitable length for a band based on the circumference of the item; (b) detaching a band of that length from a coil of perforated band material; (c) inserting one end of the band into a detent located near one end of a housing plate assembly comprising a worm drive having a housing and worm screw, housing plate, one or more protrusions, and the detent; (d) aligning perforations on the band with the protrusions; and engaging the band with the protrusions so the band lies flat on top of the housing plate; (e) wrapping the band around the item; (f) inserting the opposite end of the band into the worm drive and engaging the band with the worm drive; and (g) adjusting the worm drive to tighten the clamp. The length of band may be detached from the coil by bending or cutting at a transverse score line or marking.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 2:
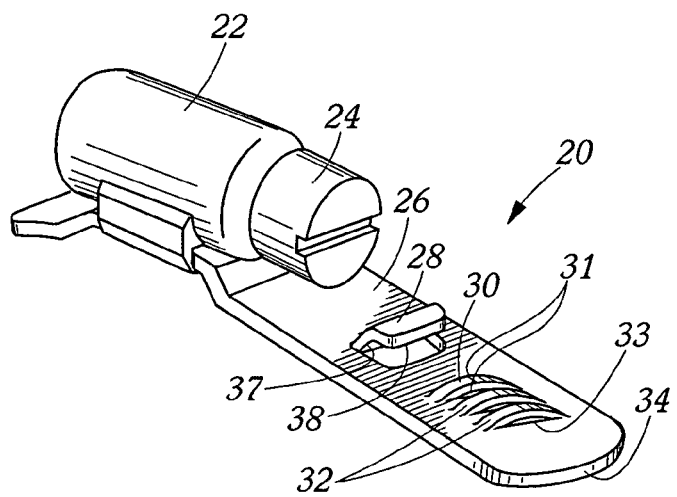
FIG. 2 is a perspective view of a housing plate assembly according to an embodiment of the invention.
Figure 3:
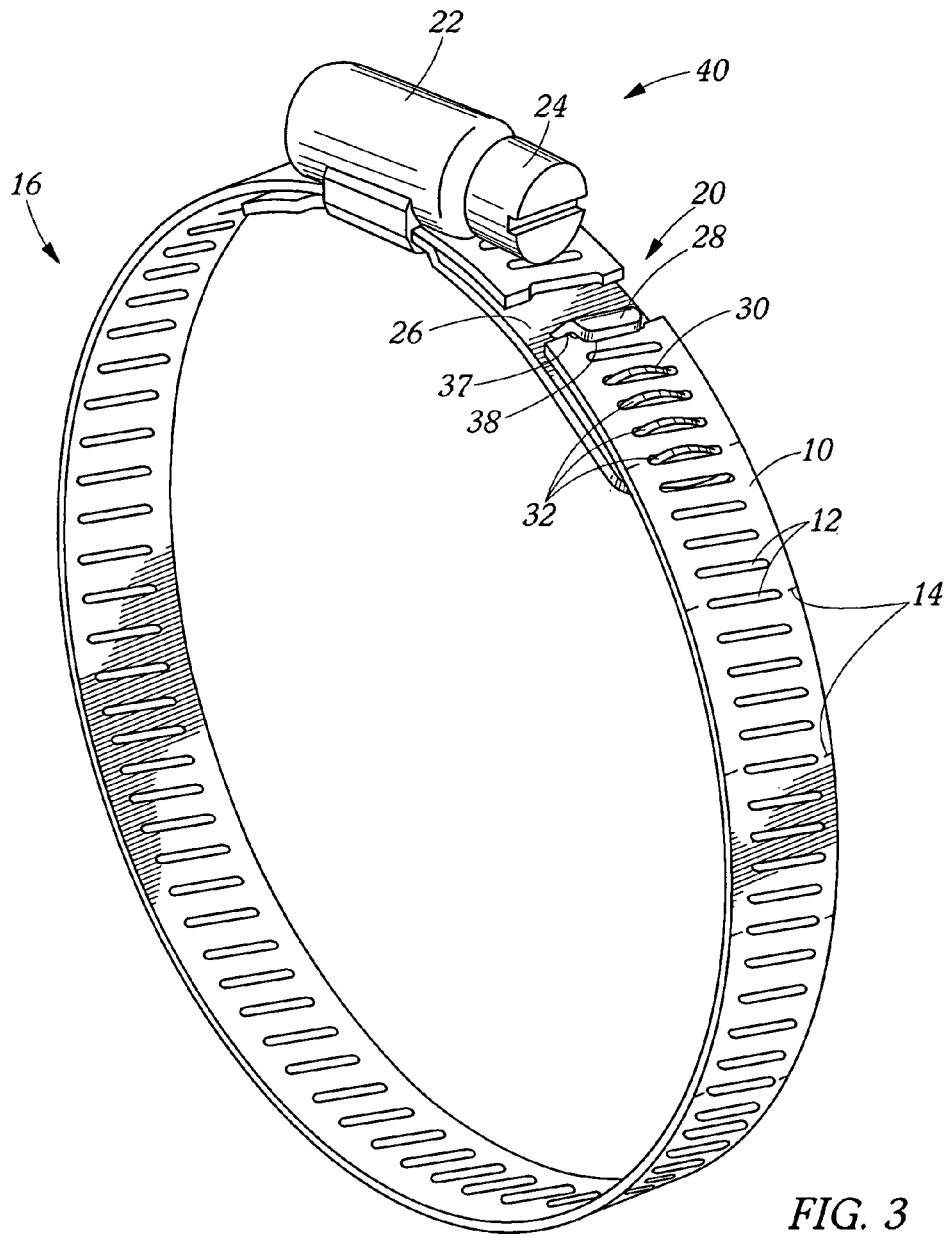
FIG. 3 is a perspective view of a hose clamp assembly according to an embodiment of the invention.
Figure 4:
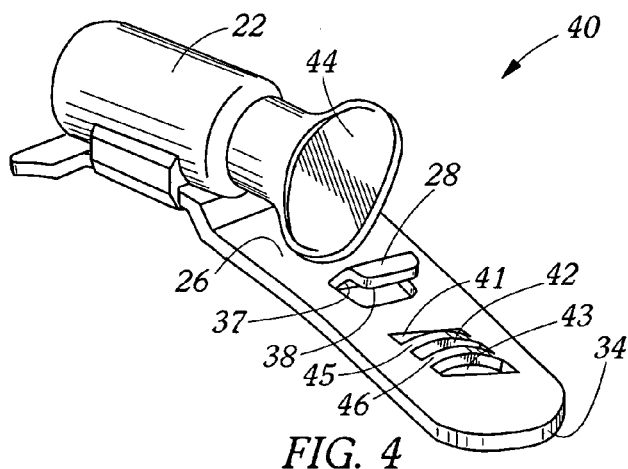
FIG. 4 is a perspective view of a housing plate assembly according to another embodiment of the invention.

FIG. 3 shows two-piece hose clamp assembly 40 according to an embodiment of the invention. Clamp assembly 40 has two main elements: housing plate assembly 20 and band 16. Housing plate assembly 20 is shown separately in FIG. 2, and band 16 may be a section broken off of coil 10 shown in FIG. 1. Housing plate assembly 40, according to another embodiment of the invention is shown in FIG. 4.

Housing plate assembly 20 includes housing plate 26 to which is attached worm drive housing 22 with worm drive screw 24, for adjusting the tension of band 16 about hose end 42. Band 16 has slots or perforations 12, which serve two purposes. Perforations 12 are sized to engage worm drive screw 22 for tightening of the clamp. Perforations 12 also engage protrusions 30 and 32 which are located on housing plate 26 near the end opposite from housing 22. Housing plate 26 also has detent 28, which holds an end of band 16 onto housing plate 26 and prevents disengagement of protrusions 30 and 32 from their associated perforations. Detent 28 also holds an end of band 16 during assembly to facilitate engagement of protrusions with perforations. The worm drive housing and the detent and protrusions are all on the same side of the housing plate, referred to as the top or top side of the plate. The housing is near one end of the plate and the detent and protrusions are near the other end the plate. No particular distance from either end is intended by use of the term "near" herein, including in the claims. What is important is the relative location of the worm housing, the detent and the protrusions, and reference to the two ends of the plate is meant to establish the relative positions of these three features. Thus, a first feature that is referred to as "near one end" could reside in the middle region of the plate, as long as another feature that is not near that one end, or that is referred to as "near the other end," is farther away from that one end than the first feature. Thus, the detent resides between the worm housing and the protrusions. The protrusions reside between the detent and the other end of the plate relative to the housing.

Figure 1:
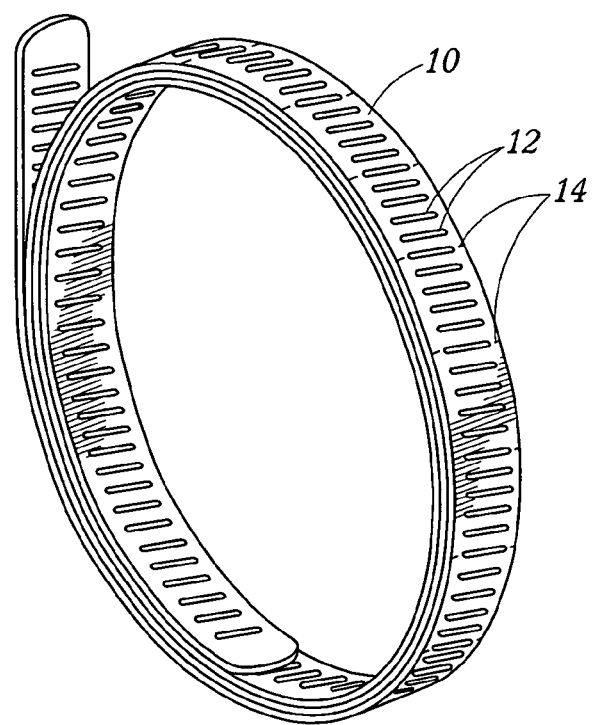
FIG. 1 is a perspective view of a coil according to an embodiment of the invention.

A clamp kit according to an embodiment of the invention has two main components: a coil and a housing plate assembly. FIG. 1 is a perspective view of coil 10. Coil 10 is a spiraled or wrapped coil of band material having spaced transverse slots or perforations 12. As used herein, transverse means aligned generally from side to side on the band, but not necessarily perpendicular to a side or edge. For example, slots or perforations 12 may be oriented at an angle corresponding to the helix angle of worm drive screw 24 and may be regularly spaced to correspond to the pitch of screw 24.

Coil 10 may have spaced markings or indentations 14. Indentations 14 are adapted to permit a predetermined length of coil material to be manually snapped off of the coil for use in a hose clamp assembly. Band 16 in FIG. 3 is an example of a snapped off length of coil material. Perforations 12 are adapted in size, shape, and spacing along the length of coil 10 to facilitate engagement with worm drive screw 24 and with protrusions 30 and 32 as illustrated in FIG. 3. Coil 10 may be made of any suitable strapping or clamping material, preferably metal, but including plastic, composite, and the like. Perforations 12 may be punched, cut, stamped, molded or produced by another suitable process. The term, perforation, is not intended to limit the method of forming the slots. Indentations 14 (which may also be referred to as score lines 14 or markings 14) may be coined, stamped, cut, scored, molded, marked, or produced by another suitable process. Indentations 14 may advantageously reside adjacent to a perforation to facilitate breaking off of a section of band material. A pair of indentations may reside adjacent to a perforation, one indentation on each side of the perforation to facilitate a transverse break in the band material. A very slight indentation may be sufficient to facilitate breaking because of the inherent weakness of the band in the vicinity of a perforation. For maximum strength, markings may be used instead of indentations. Markings may be applied in any way known in the art.

Markings or indentations 14 may be spaced along the length of coil 10 at any convenient frequency to provide various suitable lengths of band material for use in various clamp applications. For example, indentations 14 may reside adjacent to every perforation 12, providing the maximum control of the length of band material which may be detached from a coil. As another example, indentations 14 may be spaced apart approximately π inches (3.14 inches) providing for detaching band lengths that are roughly equivalent to any of a series of incremental clamp sizes based on one-inch diameter increments. As another example, indentations 14 may be spaced apart approximately π/4 inches providing for band lengths that are roughly equivalent to any of a series of incremental clamp sizes based on quarter-inch diameter increments. Indentations may be spaced apart in the range from about 0.1 inches to about nine inches. Thus, a clamp kit containing at least one coil and at least one housing plate assembly may provide a two-piece hose clamp suitable for any size clamping task, from the smallest size practical for the band material used up to the full length of the coil. The smallest size practical for the band material depends on the stiffness or flexibility of the band and, to some extent, the size of the worm drive.

FIG. 2 is a perspective view of housing plate assembly 20, the second main component of a clamp kit according to an embodiment of the invention. Housing plate assembly 20 may have housing 22 attached to housing plate 26 near one end thereof. Worm drive screw 24 resides in housing 22 and provides means for engaging one end of a section of band material for tightening the clamp, as will be described below in more detail. Any equivalent engaging means may be used. Housing plate 26, near opposite end 34 from housing 22, has detent 28 and a series of transverse slits 31 and 33. Again, the term transverse does not necessarily mean perpendicular to an edge. The slits may be made at an angle matching the helix angle of the worm drive screw. The spacing, size, and angle of the slits may correspond to the size, angle, and spacing of perforations 12. The material between pairs of slits 31 and 33 may be pushed up to form protrusions 30 and 32, respectively.

The protrusions are adapted in location, orientation, size, and shape to engage or fit into perforations on the band material. A pair of slits 33 may be slightly closer together than the width of the perforations in the longitudinal direction of the band, so that the resulting protrusions 32 may fit into perforations 12 without interference. Alternately, a pair of slits 33 may be slightly farther apart than the width of the perforations so that the resulting protrusions may have an interference with perforations 12. In one embodiment, first pair of slits 31 are slightly farther apart than the width of the perforations, so that the resulting first protrusion 30 engages a perforation with some degree of interference, while other protrusions 32 have a clearance fit. By first protrusion or first pair of slits is meant that which resides nearest the detent. Having a single protrusion with an interference fit and a number of additional protrusions with non-interference fit provides a good balance of holding power or resistance to tension and ease of assembly. It is contemplated that embodiments of the invention may have only a single protrusion having an interference fit with a band perforation and no additional protrusions. It is also contemplated that embodiments of the invention may have more than one protrusion with interference, with or without additional non-interfering protrusions. The total number of protrusions may be as many as desired or in the range from one or two to six. The total number of protrusions may be three or four. More protrusions may increase holding power. Too many protrusions may lead to binding or difficulty in assembling the clamp.

FIG. 4 illustrates housing plate assembly 40 according to another embodiment. Housing plate 26 in FIG. 4 has a series of slots 41, 42, and 43. Slots 41-43 may be of similar or the same size, shape and spacing as the perforations 12 of band 10. Web material residing between slots 41 and 42 is raised or pushed up to form protrusion 45. Web material residing between slots 42 and 43 is pushed up to form protrusion 46. It should be understood that a housing plate according to this embodiment may have a single protrusion or more than two protrusions. If the web material between adjacent slots is chosen to be about the same width as the slots, for both band 10 and housing plate 26, then the same perforation tooling may be used for manufacture of both sets of slots, and the protrusions on the housing plate may still fit the slots of the band. The fit may be interference or clearance, by suitable sizing of the web and slots.

Protrusions 30 and 32, or 45 and 46, may advantageously be in the shape of an arc, as shown in FIGS. 2, 3 and 4. A rounded protrusion shape provides for a point of entry as a protrusion enters a perforation, thus facilitating ease of assembly of a clamp.

The two slits forming the protrusion may be parallel slits as shown in FIGS. 2 and 3, resulting in a protrusion of uniform width. Other shapes of slits and/or protrusions are possible within the scope of the invention. For example, a pair of slits 33 may be curved, each one curved in the opposite direction or convexly, to produce a protrusion that is wider at the raised center than at the attached bases. The opposite curvature may instead be concave or hourglass-shaped, to produce a protrusion that is narrower at the raised center than at the attached bases, for example for a clearance fit. As another example, a pair of slits may each have a dumbbell shape (for example, two holes connected by a narrow slit), resulting in a pushed up protrusion that is wider at its peak than at its two bases. Without limitation, crescent-shaped slits or slots would provide yet another protrusion shape. The protrusion shape may be very subtle, for example, resulting from very slight curvature in the slits.

According to another embodiment, the two slots adjacent the protrusion may have parallel sides as shown in FIG. 4, resulting in a protrusion of uniform width. Other shapes of slots and/or protrusions are possible within the scope of the invention. For example, slots 41 and 42 may be more oval-shaped or may have one or more convexly curved sides to produce a raised protrusion that is narrower at the raised center than at the attached bases for a clearance or wedge fit. Likewise, the slots may instead have one or more concave sides or be hourglass-shaped, to produce a protrusion that is wider at the raised center than at the attached bases, for example for an interference fit. Without limitation, crescent-shaped slots would provide yet another protrusion shape. The protrusion shape may be very subtle, for example, resulting from very slight curvature in the slots. It should be understood that the various shapes of slots and/or protrusions could be molded or formed by other processes, although the discussion above may be suggestive of punching of slots and pushing up of web material to form protrusions.

Detent 28 may be in the shape of a bent tab including vertical part 37 protruding from plate 26 and horizontal part 38 extending from the vertical part in the direction of protrusion 30 and toward end 34 of plate 26. An end of a section of band thus fits between horizontal part 38 and plate 26 to be held in place as the section of band is made to engage protrusions 30 and 32. The detent thus prevents the band end from deflecting upward and from disengaging from the protrusions. The detent keeps the band end flat against the plate. Prior art tabs have been bent in the opposite direction from the present inventive detent, thus requiring a tab-receiving opening in the band. In contrast, the detent simply engages an end of the band without requiring a tab-receiving opening. Other shapes of detent are possible within the scope of the invention. The detent itself is adequate to hold the end of the section of band in place against the housing plate. A first protrusion with interference fit in a perforation may advantageously increase the holding effect of the detent. Such increased holding effect also may facilitate one-handed installation or blind installation in difficult clamping situations.

The housing plate may have curvature, as shown in FIGS. 2 and 3, to facilitate clamping a round object such as a hose or conduit. The housing plate may be flexible enough to conform to hoses or conduits of various diameters to facilitate sealing or clamping uses.

As already implied above, a clamp assembly, also called a hose clamp or hose clamp assembly, includes at least a section of perforated band 16 and a housing plate assembly. A clamp assembly may also include a hose fitting such as a nipple, coupling, elbow, or the like, and/or a section of hose. A clamp assembly may also include a permanent or detachable hand tightening means, such as a wing nut, thumb screw, or butterfly drive as illustrated by wing drive 44 in FIG. 4.

In use, a section of coiled band material is detached off of the coil with or without use of tools at the location of a transverse indentation or marking. The length is chosen to fit the application, generally approximately the circumference of the item to be clamped. The closest set of indentations, markings, or score line may be located, or the next larger set may be chosen. The band may be bent outward with respect to the coil curvature at about a 45° angle at the selected score line. Then the band may be bent in the opposite direction at about 45°. The band will break off at the score line. Of course, the section of band material may instead be cut or severed from the coil using any appropriate cutting tool available. Markings or indentations may then provide convenient indications of useful section lengths for cutting.

One end of the section of band is inserted into the housing where it is engaged by the worm screw and pulled through the housing. The other end, after being wrapped around the item to be clamped, is inserted into the detent and engaged with or snapped over the protrusions. The worm screw is then tightened to the desired tension to hold the item to be clamped. For example, a tightening torque of approximately 30 to 40 inch-pounds may give a suitable installation tension for many applications including hose sealing applications.

In an alternate assembly method, one end of a section of band may first be inserted into the detent on the top surface of a housing plate. The band perforations may then be aligned with the protrusions on the plate and the band may then be engaged with the protrusions or snapped onto the housing plate. The other end of the section of band may then be inserted into the worm drive housing, and the clamp tightened. The housing plate may be deformable so that it bends around a hose and conforms to the hose shape or diameter when installed. The clamp may be tightened to about 30 to 40 inch-pounds torque, for example, for sealing applications.

A clamp kit may include at least one coil of band material and at least one housing plate assembly, from which hose clamps of various diameters can be fabricated, for example, for temporary use. Combining a section of band of desired length with a housing plate assembly constitutes a hose clamp. To facilitate assembly without tools, a clamp kit may include a wing-nut, thumb-screw, or butterfly drive adapted to engage the worm screw for tightening by hand. A clamp kit may thus be a useful element of a maintenance kit or an emergency repair kit for situations requiring banding or hose clamping operations. The inventive variable length clamp allows minimal parts inventory to meet a variety of clamp sizing requirements. Applications may include, but are not limited to automotive, marine, and household use. A clamp kit may include one or multiple housing plate assemblies and one or more rolled or coiled lengths of band material. A clamp kit and/or a maintenance kit may include additional parts or accessories, for example, one or more tools, fittings, hose, or the like.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A clamp kit comprising:
    a coil of band material comprising a plurality of spaced perforations; and
    at least one housing assembly comprising a worm-drive housing, a worm screw, and a housing plate; the plate comprising two ends, a top surface, one or more protrusions, and a detent; the screw residing in the housing and adapted to engage said perforations; the housing, the detent, and the protrusions residing on the top surface; the detent adapted to engage an end of said coil, and residing between the housing and the protrusions; the protrusions adapted to engage the perforations.

2. The clamp kit of claim 1 wherein said coil further comprises a plurality of transverse indentations or markings spaced at predetermined intervals along the coil.

3. The clamp kit of claim 1 wherein at least one of said one or more protrusions has an interference fit with said perforations.

4. The clamp kit of claim 1 wherein said detent is a raised, bent tab extending toward said protrusions.

5. The clamp kit of claim 1 wherein the number of protrusions is in the range of from one to six.

6. The clamp kit of claim 1 wherein the protrusions comprise raised plate material residing between two slits or slots.

7. The clamp kit of claim 1 wherein the number of protrusions is three or four.

8. The clamp kit of claim 3 wherein said protrusions reside between said one said plate end and said detent, and said protrusion nearest said detent has said interference fit.

9. A maintenance or repair kit comprising a clamp kit comprising:
    a coil of band material comprising a plurality of spaced perforations; and
    at least one housing assembly comprising a worm-drive housing, a worm screw, and a housing plate; the plate comprising two ends, a top surface, one or more protrusions, and a detent; the screw residing in the housing and adapted to engage said perforations; the housing, the detent, and the protrusions residing on the top surface; the detent adapted to engage an end of said coil, and residing between the housing and the protrusions; the protrusions adapted to engage the perforations.

10. The repair kit of claim 9 wherein said coil further comprises a plurality of transverse markings or indentations spaced at regular intervals along the coil.

11. A hose clamp comprising: a predetermined length of band having a plurality of evenly spaced perforations;
    a housing assembly comprising a worm-gear housing, a worm gear, and a housing plate;
    with the housing plate comprising one or more protrusions and a detent;
    with the detent residing between the housing and the protrusions, and with housing, protrusions and detent all on the top side of the plate;
    with one end of the perforated band held flat on top of the plate by the detent;
    with the protrusions aligned with and engaging perforations; and
    with the band curved in the form of a ring so the other end of the band engages with the gear in the worm-gear housing.

12. The hose clamp of claim 11 wherein at least one of said one or more protrusions has an interference fit with said perforations.

13. The hose clamp of claim 11 wherein said detent is a raised, bent tab extending toward said other end of the plate.

14. The hose clamp of claim 11 wherein the number of protrusions is in the range of from two to six.

15. The hose clamp of claim 11 wherein the number of protrusions is three or four.

16. The hose clamp of claim 11 wherein the protrusions comprise raised plate material residing between two slits or slots.

17. The hose clamp of claim 12 wherein said protrusions reside between said other end of the plate and said detent, and said protrusion nearest said detent has said interference fit.

18. A method of clamping at least one item comprising:
  a) selecting a suitable length for a band based on the circumference of said item;
  b) detaching a band of said length from a longer coil of perforated band material;
  c) inserting one end of said band into a detent residing on a housing plate assembly comprising a worm drive having a housing and worm screw, a housing plate, one or more protrusions, and said detent; said detent residing between said housing and said protrusions;
  d) aligning perforations on said band with said protrusions; and engaging said band with said protrusions so said band lies flat on top of said housing plate;
  e) wrapping the band around the item;
  f) inserting the opposite end of the band into the worm drive and engaging the band with the worm drive; and
  g) adjusting the worm drive to tighten the clamp.

19. The method of claim 18 wherein said detaching is carried out by bending or cutting at or near a transverse indentation or marking on said coil.

20. The method of claim 18 wherein each of the protrusions comprise raised plate material residing between two slits or slots, and the number of protrusions is one to six.

* * * * *